United States Patent [19]
Pidgeon

[11] Patent Number: 5,850,305
[45] Date of Patent: Dec. 15, 1998

[54] ADAPTIVE PREDISTORTION CONTROL FOR OPTICAL EXTERNAL MODULATION

[75] Inventor: Rezin E. Pidgeon, Atlanta, Ga.

[73] Assignee: Scientific-Atlanta, Inc., Norcross, Ga.

[21] Appl. No.: 769,692

[22] Filed: Dec. 18, 1996

[51] Int. Cl.$^6$ .................................................. H04B 10/04

[52] U.S. Cl. ............................ 359/187; 359/161; 372/32

[58] Field of Search .................................... 359/187, 188, 359/161, 125, 126, 127; 372/31, 32, 38

[56] References Cited

U.S. PATENT DOCUMENTS

| | | | |
|---|---|---|---|
| 5,161,044 | 11/1992 | Nazarathy et al. . | |
| 5,262,883 | 11/1993 | Pidgeon | 359/125 |
| 5,267,071 | 11/1993 | Little et al. . | |
| 5,282,072 | 1/1994 | Nazarathy et al. | 359/157 |
| 5,347,388 | 9/1994 | Little et al. . | |
| 5,361,156 | 11/1994 | Pidgeon | 359/161 |
| 5,424,680 | 6/1995 | Nazarathy et al. | 330/149 |
| 5,430,568 | 7/1995 | Little et al. . | |
| 5,453,868 | 9/1995 | Blauvelt et al. | 359/173 |
| 5,515,199 | 5/1996 | Farina | 359/356 |
| 5,678,198 | 10/1997 | Lemson | 455/67.1 |

OTHER PUBLICATIONS

Pidgeon et al., "Status of 1550 nm Analog Fiber Optic Systems and Performance Advantages," Technical Papers, SCTE Conference, Jan. 1991, pp. 155–159.

Bertelsmeier et al., "Linearization of Broadband Optical Transmission Systems by Adaptive Predistortion", Technical University Darmstadt, 1984, pp. 206–212.

*Primary Examiner*—Rafael Bacares
*Attorney, Agent, or Firm*—Kelly A. Gardner; Kenneth M. Massaroni; Hubert J. Barnhardt, III

[57] ABSTRACT

A communication system, such as a cable television system, includes an optical transmitter (FIG. 2) that includes adaptive predistortion control circuitry (104). The adaptive predistortion control circuitry (104) measures the distortion produced by television band signals processed in the communication system. In the optical transmitter (FIG. 2), the distortion signal produced by the television signals is a relatively high-level signal from which necessary predistortion control signals may be more easily processed. Additionally, the adaptive predistortion control circuitry (104) detects both the amplitude and the polarity of distortion within the optical output (FIG. 2) of the optical transmitter, which enables the control circuit (104) to determine the correct polarity and level adjustments that should be made to the predistorter (102) included in the optical transmitter.

4 Claims, 4 Drawing Sheets

FIG. 1 (*PRIOR ART*)

ADAPTIVE PREDISTORTION CONTROL FOR OPTICAL EXTERNAL MODULATION

TECHNICAL FIELD

The present invention generally relates to the linearization of nonlinear optical transmission systems by the generation of a compensation signal and, more particularly, to an apparatus and method of compensating for the nonlinearities of an optical transmission system including at least one optical source, an electro-optical modulator, a predistorter, and an adaptive predistorter control circuit.

BACKGROUND OF THE INVENTION

Fiber optic CATV systems for transmission of analog video signals may employ intensity modulation in which the optical intensity of the optical signal varies directly with the modulation of a radio-frequency (RF) carrier. For example, a baseband video signal may be used to frequency modulate or amplitude modulate an RF carrier which is in turn used to modulate the intensity of an optical signal.

For analog modulation, a high degree of linearity is required. Many CATV fiber-optic transmitters employ a direct modulation technique in which a distributed feedback (DFB) laser is directly modulated by the RF signal. A second technology is external modulation in which an optical output from an optical source, for example, a laser, is modulated by an electro-optic modulator in response to the analog RF signal (or a digital signal). The laser and electro-optic modulator together comprise the optical transmitter.

However, with external modulation, it is necessary to provide some means of linearizing the electro-optic characteristics of the optical transmitter in order to meet the distortion requirements for CATV applications. With many electro-optic modulators, the optical intensity is a raised-cosine function of the electrical input. To ensure a linear output of the electro-optic modulator, feedforward, optical linearization, and predistortion techniques have been developed. Feedforward techniques are those in which the distortion of the optical output is corrected using a second laser or electro-optic modulator to produce distortion cancellation signals which are added to the optical output prior to transmission. Predistortion techniques are those in which the RF signal is pre-distorted prior to modulation of the optical output, such that the pre-distortions cancel the distortions produced by the electro-optic modulator, resulting in a linear optical output.

Predistortion is the more desirable of the technologies because it does not involve the added expense and complexity of a second laser or electro-optic modulator for distortion cancellation. However, with using open-loop predistortion circuitry, it is difficult to achieve the high degree of distortion cancellation required due to sensitivity to environmental changes and changes in other parameters. Therefore, an adaptive feedback control system is desirable to adjust the predistortion as the system parameters change.

One type of adaptive feedback control as described in U.S. Pat. No. 5,161,044 involves the addition of one or more low-level pilot signals, which may have frequencies F1 and F2, to the broadband RF input signal. As shown in prior art FIG. 1 (corresponding to FIG. 8 of the '044 patent), an optical photodetector 905 and synchronous detectors 907 and 908 at the distortion frequencies (F2±F1 and 2F2−F1) are positioned at the output of the electro-optic modulator 902 to detect the intermodulation distortion from the two low-level signal carriers. The intermodulation distortion includes the second order and third order beat products of the two low-level carriers. The pilot signals and their harmonic and intermodulation products must fall outside of the band of CATV signals, such as the frequency band below 50 MHZ.

Composite second order (CSO) distortion in each channel is the total power of the separate sum and difference-frequency beats of the other channels falling within that channel. For example, a video channel at 150 MHZ and another video channel at 204 NHZ may produce a second order distortion product at 54 MHZ, the difference frequency, and at 354 MHZ, the sum frequency. The composite of all second order beats falling within a particular channel is the CSO of that channel. A triple beat is a third-order intermodulation product of two or three fundamental carriers which combine, such as (F1±F2±F3), (2F1±F2), etc. The CTB is the composite of all the beats falling in a particular channel for a particular range of frequencies.

A drawback to the system of FIG. 1 is that the intermodulation distortion of the two low level carriers has a relatively low power level which may fall near or below the minimum detectable level of the photodetector and photodetector amplifier, making this distortion difficult to detect. As a result, a very low bandwidth and a long integration time are necessary to achieve the sensitivity required to detect the low-level distortion components. While the low-level distortion signals can be extracted from the noise using synchronous demodulation techniques, narrow bandwidth RF amplifiers with high dynamic range may be required to provide low offset in the RF-to-DC conversion of the synchronous demodulator.

A further drawback of this method is that the distortion of the television band itself is not actually measured since the harmonic and intermodulation products must come form pilot carriers outside of the CATV band of frequencies. The distortion of the television band is only estimated based on the distortion of the low-level pilot carriers. As a result, the corrections made by the predistortion circuit of FIG. 1, while accurate for the out-of-band pilot carriers, may not be accurate for the television band signals.

SUMMARY OF THE INVENTION

Therefore, in view of the drawbacks discussed above, the present invention provides an apparatus and method for adaptive predistortion control in which the distortion produced by the television band signals is measured. Furthermore, in the apparatus and method according to the present invention, the distortion signal produced by the television signals is a relatively high-level signal from which the necessary predistortion control signals may be more easily processed. Moreover, the adaptive predistortion control circuit according to the present invention detects both the amplitude and polarity of distortion within the optical output, enabling the control circuit to determine how much to adjust the predistortion circuit and in which polarity to adjust it.

A fiber optic CATV transmission system according to the present invention includes an optical source for providing an optical signal; a predistorter for generating a distortion cancellation signal in response to a radio-frequency input; an electro-optic modulator for receiving the optical signal and the predistorter RF and DC output signals and modulating the optical signal in response to the signal; and an adaptive predistortion control circuit for providing a predistortion cancellation control signal and modulation bias control to the predistorter. The adaptive predistortion control circuit includes a receiver for receiving the modulated optical signal output by the modulator; a bandpass filter for filtering the modulated optical signal to obtain a first distortion component; a distortion generator for receiving the RF signal to be transmitted and generating a second distortion component in response to the RF input; a mixer for synchronously demodulating a product of the first and second distortion components to obtain a corrections signal; and an integrator for receiving the correction signal and generating the predistortion control signal and bias control signal in response thereto. The amplitude of the distortion cancellation signal produced by the predistorter is adjusted in response to the predistortion control signal, thereby reducing odd-order distortion of the transmitted optical signal. The modulator bias to the electro-optic modulator is adjusted in response to the modulation bias control from the adaptive predistortion control circuit to reduce even-order distortion of the transmitted signal.

A method for adaptively controlling predistortion in a fiber optic transmitter having an external modulator and a predistorter includes the steps of generating a predistortion signal in response to a radio-frequency input signal to be transmitted; modulating an optical signal using the predistortion signal; transmitting the modulated optical signal; receiving the modulated optical signal; filtering the modulated optical signal to obtain a first distortion component; generating a second distortion component using the radio-frequency input signal; synchronously demodulating a product of the first and second distortion components to obtain an error correction signal; integrating the error correction signal to generate a modulator bias control signal; and integrating the error correction signal to control the predistorter signal, thereby reducing distortion of the modulated optical signal.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE INVENTION

FIG. 1 provides a block diagram of a known optical transmitter.

FIG. 2 provides a block diagram of an optical transmitter including an adaptive predistortion control circuit according to the present invention.

FIGS. 3A, 3B, and 3C provide diagrams of modulators for use in the optical transmitter of FIG. 2.

FIG. 4 provides a functional block diagram of operation of an adaptive predistortion control circuit according to the present invention.

DETAILED DESCRIPTION

Figure 1:
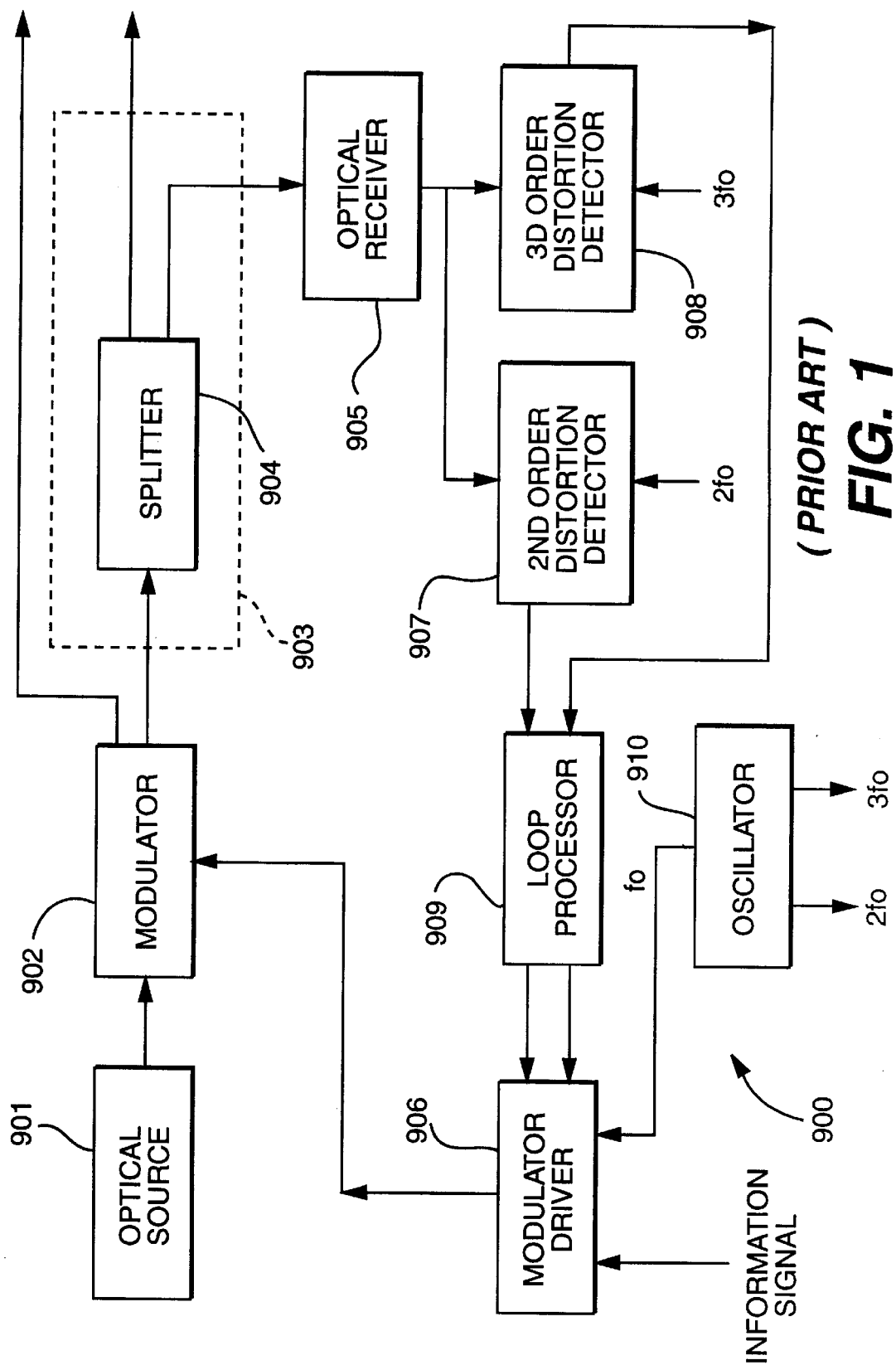
Figure 2:
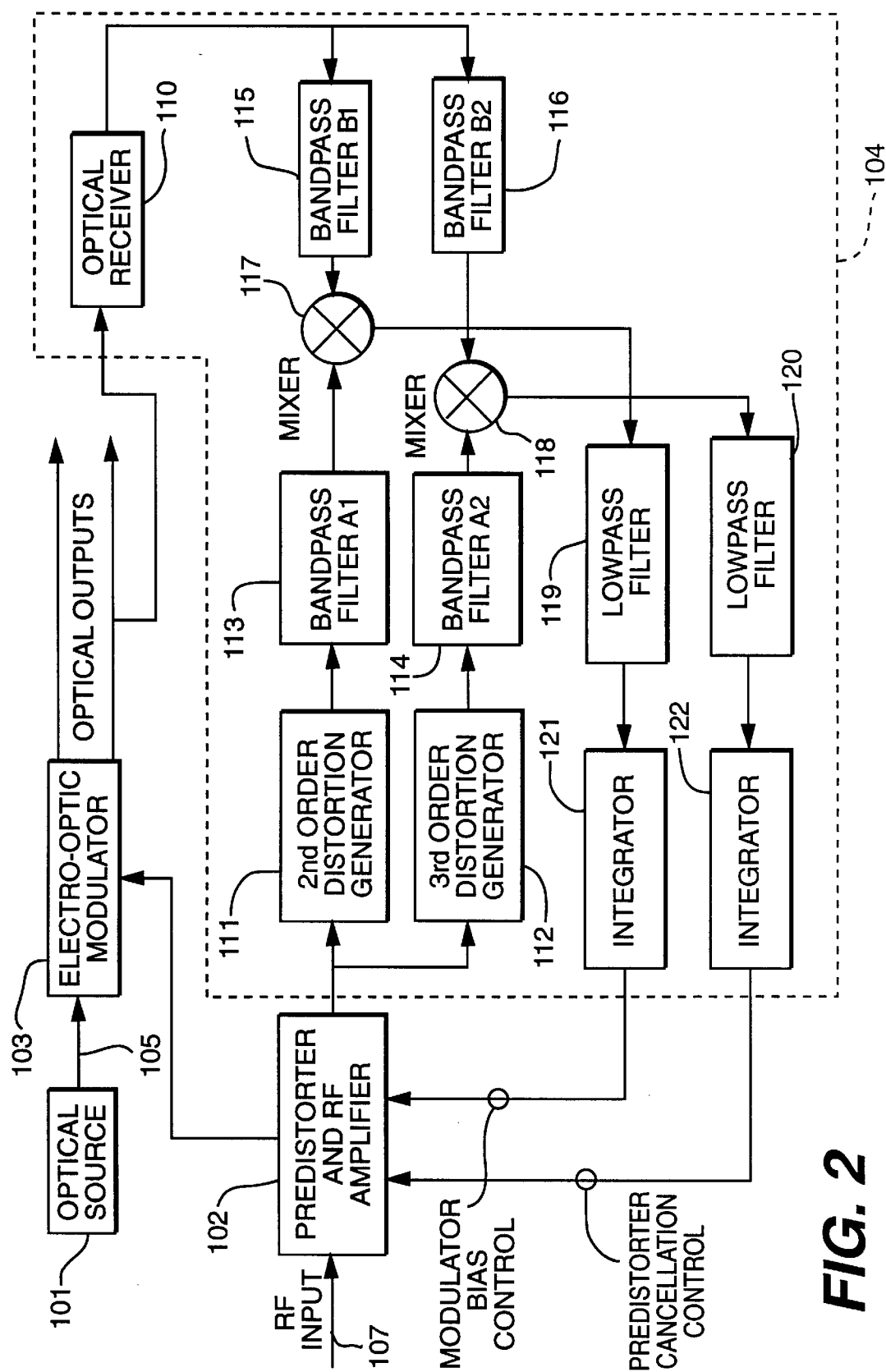

With reference to FIG. 2, a transmitter for use in a fiber optic communications system according to the present invention includes an optical source 101, a predistorter 102, an external modulator 103, and an adaptive predistortion control circuit 104. Communications system as used herein broadly refers to a system for communicating information from one point to another. The information may include, but is not limited to, analog video, analog audio, digital video, digital audio, text services such as news articles, sports scores, stock market quotations, and weather reports, electronic messages, electronic program guides, database information, software including game programs, and wide area network data.

Optical source 101 may be, for example, a high power narrow linewidth distributed If feedback (DFB) laser or a diode-pumped solid-state laser which are commercially available from many domestic and foreign manufacturers. Optical source 101 generates an optical carrier 105 which is subsequently intensity-modulated by the electro-optic modulator 103 in accordance with a radio-frequency (RF) signal 107, for example, an RF television band signal. Notably, the modulator 103 modulates the optical carrier 105 in response to both the input RF television band signal and predistortion signal provided by a predistorter 102 described in detail below. Thus, the modulator 103 modulates the optical carrier 105 in accordance with a predistorted RF signal.

The electro-optic modulator 103 has a raised cosine response such that the intensity of the output signal from the modulator 103 varies as the sine of the RF input amplitude. While other modulators may be used without departing from the scope of the present invention, it is preferable that the intensity of the output of electro-optic modulator 103 signal vary linearly with the RP input signal amplitude.

The modulator 103 may be a single-stage Mach-Zehnder (MZ) interferometric modulator (MZI) constructed either with a single or with a dual complementary output.

Figure 3A:
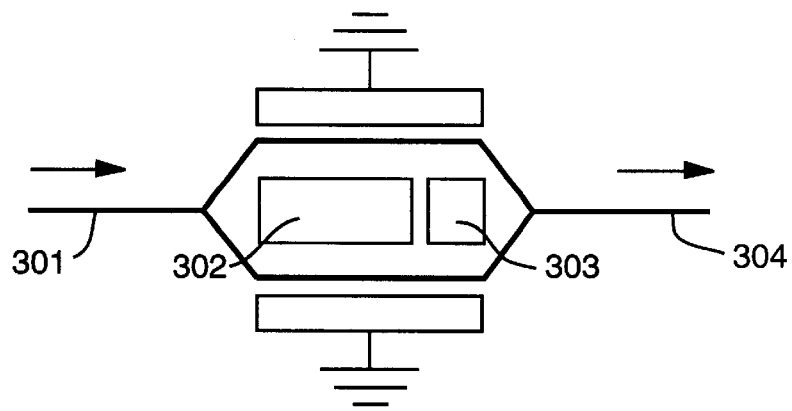

A single output MZI structure is composed of a Y-branch or a 1×2 directional coupler at the input with a Y-branch interferometer at the output as shown in FIG. 3A. The single output MZI includes a polarization maintaining (PM) fiber input 301, an RF port 302, a bias port 303, and a standard single-mode fiber output 304.

Figure 3B:
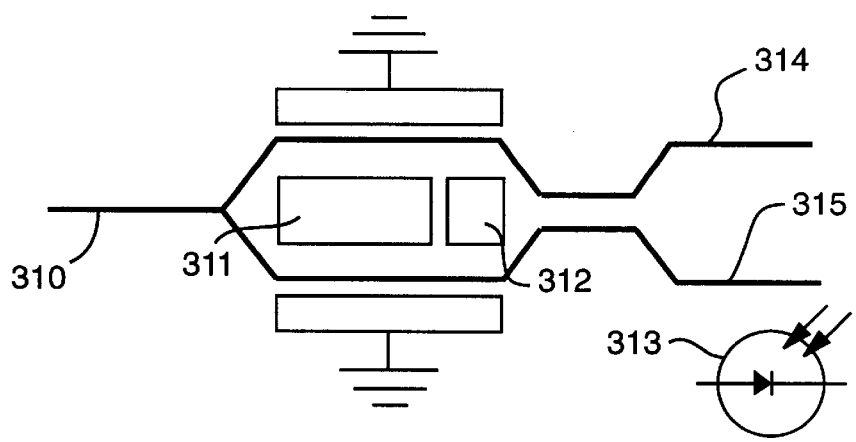

A complementary output MZ structure is composed of a Y-branch or a directional coupler at the input and a 2×2 directional coupler at the output a shown in FIG. 3B. Such modulators show a raised cosine input-output nonlinear transfer characteristic with very high extinction ratio (on-to-off transmission ratio). The dual output MZI includes a PM fiber input 310, an RF port 311, a bias port 312, a photodetector 313, and two SM fiber outputs 314 and 315.

Since the dual output Y-fed balanced modulator has an extra available output for distribution of AM-VSB multichannel signals, it is preferred over the single output MZI. A polarized light from a single-frequency laser source, such as from a Distributed Feedback (DFB) semiconductor laser source, is launched into the input port of the modulator. The optical field while passing through the two LiNbO$_3$ waveguide arms can be phase modulated when an RF signal is applied through the RF port at a set DC bias voltage (applied through the DC port). The optical field at each waveguide arm is 180° out of phase prior to being combined by the 2×2 coupler or by the Y-branch combiner. For maximum optical power transfer through the modulator arms, the state of polarization of the incoming optical field is aligned to the polarization axis (slow or fast) or the modulator. For multichannel analog CATV signal transmission, the device is biased at the quadrature point where linearity is maximized. When electro-optic modulators are operated at the quadrature point the second-order distortion components are canceled and only odd-order distortion components are present.

Figure 3C:
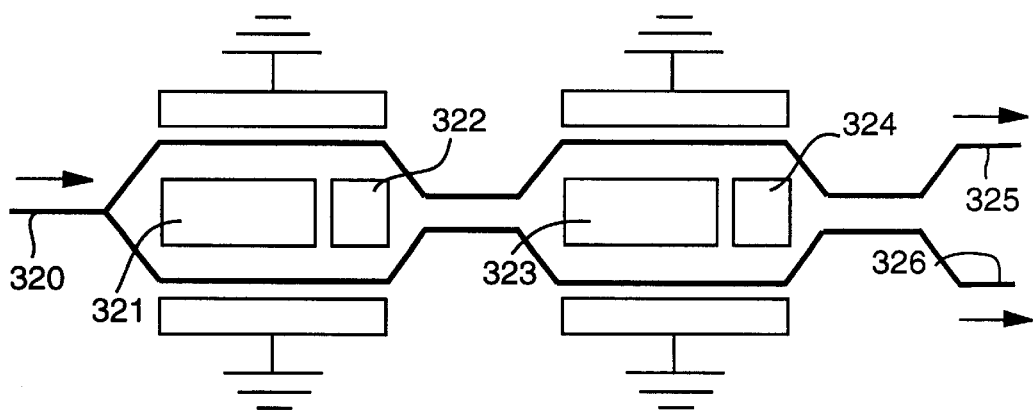

The inherent third-order non-linearity of the MZI can be canceled by parallel or serial cascading two MZI (also known as optically linearized MZI) as shown in FIG. 3C. The optically linearized MZI of FIG. 3C includes a PM fiber input 320, a first RF port 321, a first DC bias port 322, a second RF port 323, a second DC bias port 324, and two SM fiber outputs 325 and 326.

With reference to FIG. 2, the predistorter and RF amplifier 102 are provided to compensate for the non-linearities of the electro-optic modulator. The predistorter 102 receives an RF input representing the television or other signal to be transmitted. In response to the input RF signal, the predistorter 102 provides a signal to the electro-optic modulator 103 including both the RF input (311 in FIG. 3B, for example) and a DC bias (312 in FIG. 3B, for example). In response, the waveguides vary the amplitude of the optical carrier signal provided by optical source 101. When the outputs from each waveguide are summed, the resulting signal is an intensity-modulated signal such that the intensity variations correspond to the RF input.

An adaptive predistortion control circuit 104 according to the present invention includes an optical receiver 110 for receiving an optical output from the modulator 103; second and third order distortion generation circuits 111 and 112 for respectively generating second order and third order distortion signals; bandpass filters 113, 114, 115, and 116; mixer circuits 117 and 118; low pass filters 119 and 120; and integrators 121 and 122.

Functionally, the control circuit 104 has two parts. The first part is a second order correction component which controls the bias point of the modulator such that the output of the modulator 103 is biased at the "quadrature point" (zero degrees of the sinusoidal transfer function) at which there is no second order distortion. Therefore, the second order correction component provides a DC input to the predistorter 102 which, in turn, adjusts the DC bias of the modulator 103 accordingly. The second order correction component of the control circuit 104 includes optical receiver 110, bandpass filter 115, mixer 117, bandpass filter 113, second order distortion generator 111, lowpass filter 119, and integrator 121.

The second part of control circuit 104 is a third order correction component which adjusts the parameters of the predistorter 102 to achieve cancellation of third order distortion generated by the nonlinear transfer function of the modulator 103. The third order correction component includes optical receiver 110, bandpass filter 116, mixer 118, bandpass filter 114, CTB distortion generator 112, lowpass filter 120, and integrator 122.

Several different types of second order and third order distortion generators are disclosed in co-pending U.S. application Ser. No. 07/958,976, filed Oct. 9, 1992, incorporated herein by reference. Any of the distortion generation circuits disclosed in this application may be used in the adaptive predistortion control circuit 104 according to the present invention. Other distortion generators capable of producing accurate second order and third order intermodulation distortion may also be used without departing from the scope of the present invention.

The operation of control circuit 104 is as follows. The RF input signal to be transmitted over the optical link is provided to the second order distortion generator 111 and the third order distortion generator 112. Second order distortion generator 111 generates a composite second order (CSO) distortion due to intermodulation of the carriers of the input RF signal. This CSO distortion is output to bandpass filter 113 which has its center frequency at one of the CSO frequencies below the band of the RF input signal (below 50 MHZ for NTSC CATV transmissions) to prevent overload of the following circuits by the TV carriers. For the NTSC CATV frequency plan, carriers are spaced 6 MHZ apart, and CSO distortion components fall at 6 MHZ harmonics from 6 MHZ up through the TV band. An appropriate frequency for bandpass filter 113 would be one of the 6 MHZ harmonics from 6 to 50 MHZ.

Similarly, the third order generator 112 generates composite triple beat (CTB) distortion components from the input RF signal. This CTB component is output to bandpass filter 114 which also has its center frequency below the band of the RF input signal. For the NTSC CATV frequency plan, carriers are offset by 1.25 MHZ from 6 MHZ harmonics. The preponderance of CTB components is from carrier combinations of the form F1+F2−F3. These CTB components fall at carrier frequencies and at frequencies of 1.25 MHZ, 7.25 MHZ, 13.25 MHZ, etc. An appropriate frequency for bandpass filter 114 would be one of the CTB frequencies below 50 MHZ.

The output of bandpass filter 113 passes to mixer 117. The output from bandpass filter 114 passes to mixer 118.

Optical receiver 110 is coupled to the output of modulator 103. This device transduces the optical signal output by modulator 103 to an electric signal by means of a photodiode and amplifier. The resulting electric signal is applied to bandpass filters 115 and 116. The center frequency for filter 115 is the same as for filter 113, and the center frequency for filter 116 is the same as for filter 114. The outputs of filters 115 and 116 are respectively provided to mixer circuits 117 and 118.

To detect second order distortion in the modulated optical signal, mixer circuit 117 multiplies the second order component generated by second order distortion generator 111 with the second order signal from bandpass filter 115. This multiplication process synchronously demodulates the undesired CSO distortion generated by the intermodulation of the RF carriers and results in a first baseband correction signal. This synchronous demodulation process, as it is commonly known, results in the system noise bandwidth being equal to the baseband noise bandwidth.

The first error correction signal is then output from mixer 117 to a lowpass filter 119 which might have a frequency cut-off in the low audio frequency range. The resulting error signal is applied to an integrator 121. The output of integrator 121 is connected through 102 to the DC port of modulator 103. In this way, the bias point of the modulator is adjusted to compensate for temperature changes and drift in the modulator to maintain operation continuously fixed at the quadrature point, and the second order distortion is suppressed in the optical output of the modulator 103.

To minimize third order distortion from the modulated optical signal, mixer circuit 118 multiplies the third order component generated by third order distortion generator 112 with the third order (CTB) component from the output of the modulator 103 and synchronously demodulates the product of the two waveforms to obtain a second correction signal. The second correction signal is then output to a lowpass filter 120 which might have a frequency cut-off in the low audio frequency range. The integrator 122 generates an appropriate predistortion cancellation control signal which is provided to the predistorter 102. The signal includes both polarity and amplitude adjustments which enable the predistorter 102 to adjust the RF signal to compensate for the third order distortion in the modulated optical output. As a result, the third order distortion may be eliminated from the optical output without causing higher order distortions in the optical output.

The operation of the distortion generators 111 and 112 are described in further detail in U.S. patent application Ser. No. 07/958,976 filed Oct. 9, 1992 and incorporated herein by reference.

Figure 4:
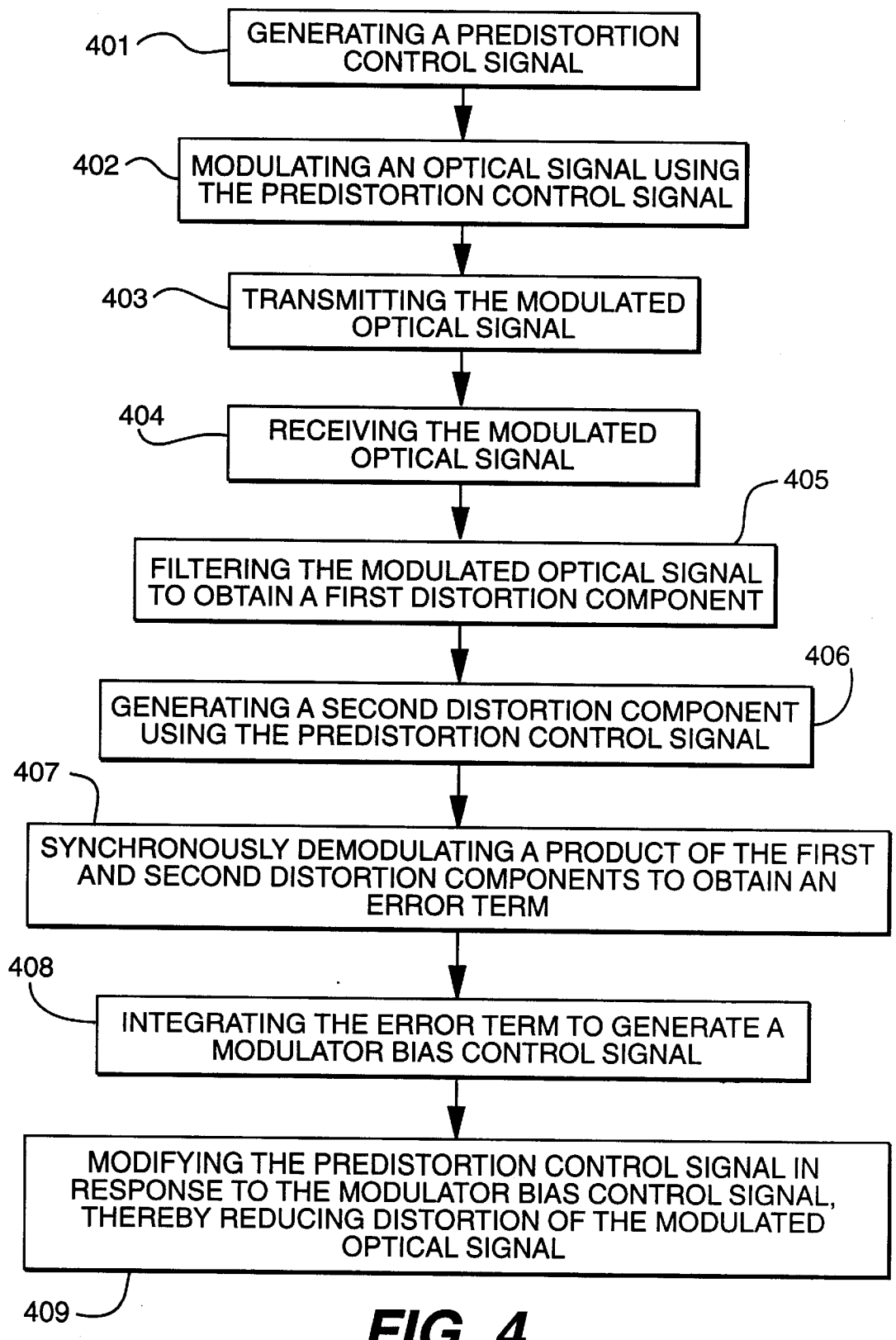

A method of adaptive predistortion control according to the present invention will now be described with reference to FIGS. 2 and 4. This method includes the steps of:

401—Generating a predistortion signal input signal in response to an RF input signal to be transmitted;

402—Modulating an optical signal using the predistortion signal;

403—Transmitting the modulated optical signal;

404—Receiving the modulated optical signal;

405—Filtering the modulated optical signal to obtain a first distortion component;

406—Generating a second distortion component using the RF input signal;

407—Synchronously demodulating a product of the first and second distortion components to obtain an error correction signal;

408—Integrating the error signal to generate a modulator bias control signal; and

409—Integrating the error signal to generate a control signal to control the predistorter signal, thereby reducing distortion of the modulated optical signal.

In the method according to the present invention, the distortion signals may be, for example second order distortions, third order distortions, fifth order distortions, etc.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

What is claimed is:

1. An external modulation fiber optic CATV transmitter, comprising:

an optical source for providing an optical signal;

a predistorter for generating a distortion cancellation signal in response to a radio-frequency input;

an electro-optic modulator for receiving said optical signal and said distortion cancellation signal and modulating said optical signal in response to said distortion cancellation signal; and an adaptive predistortion control circuit for providing a predistortion cancellation control signal and a modulation bias control signal, said circuit comprising a receiver for receiving said modulated optical signal output by said modulator;

a filter for filtering intermodulation distortion from said modulated optical signal to obtain a first distortion component;

a distortion generator for receiving a radio-frequency input signal from said predistorter and generating a second distortion component in response to said radio-frequency input signal;

a mixer for synchronously demodulating a product of said first and second distortion components to obtain a correction signal;

a lowpass filter; and an integrator, said lowpass filter and said integrator generating said predistortion cancellation control signal and said modulation bias control signal in response to residual intermodulation distortion in the output of said electro-optic modulator;

wherein said predistorter modifies said distortion cancellation signal in response to said predistortion cancellation control signal, and wherein a bias of said electro-optic modulator is adjusted in response to said modulation bias control signal, thereby reducing distortion of said modified optical signal.

2. A method of adaptive predistortion control for optical external modulation, comprising the steps of:

generating a predistortion signal in response to a radio-frequency input signal to be transmitted;

modulating an optical signal using said predistortion signal;

transmitting said modulated optical signal;

receiving said modulated optical signal;

filtering said modulated optical signal to obtain a first distortion component;

generating a second distortion component using the radio-frequency input signal;

synchronously demodulating a product of said first and second distortion components to obtain an error correction signal;

integrating said error correction signal to generate a modulator bias control signal; and integrating said error correction signal to control the predistorter signal, thereby reducing distortion of said modulated optical signal.

3. A method according to claim 2, wherein said error correction signal includes a second order correction signal and a third order correction signal.

4. A method according to claim 3, wherein said second order correction signal is integrated to generate said modulator bias control signal and said third order correction signal is integrated to control said predistorter signal.

* * * * *